(12) United States Patent
Chon et al.

(10) Patent No.: US 8,040,435 B2
(45) Date of Patent: Oct. 18, 2011

(54) APPARATUS FOR DETECTING SYNCHRONIZATION

(75) Inventors: E-woo Chon, Seoul (KR); Jae-hong Park, Seongnam-si (KR); Woon Na, Hwaseong-si (KR); Hyung-jun Lim, Suwon-si (KR); Jae-hong Park, Seoul (KR); Sung-cheol Park, Seongnam-si (KR); Mi-kyoung Seo, Suwon-si (KR); Eui-jin Kwon, Seoul (KR)

(73) Assignee: Samsung Electroncis Co., Ltd., Suwon-Si (KR)

(*) Notice: Subject to any disclaimer, the term of this patent is extended or adjusted under 35 U.S.C. 154(b) by 1290 days.

(21) Appl. No.: 11/671,815

(22) Filed: Feb. 6, 2007

(65) Prior Publication Data

US 2007/0182850 A1  Aug. 9, 2007

(30) Foreign Application Priority Data

Feb. 7, 2006 (KR) .................. 10-2006-0011776

(51) Int. Cl.
*H04N 5/06* (2006.01)
*H01J 3/14* (2006.01)
(52) U.S. Cl. ...................... 348/524; 250/234
(58) Field of Classification Search .............. 348/525, 348/500, 509–510, 512, 516–517, 540, 537, 348/521–524
See application file for complete search history.

(56) References Cited

U.S. PATENT DOCUMENTS

| 4,500,930 A | * | 2/1985 | Hamalainen et al. | 386/232 |
| 5,844,622 A | | 12/1998 | Hulvey | |
| 6,271,888 B1 | * | 8/2001 | Lares et al. | 348/521 |
| 6,295,093 B1 | * | 9/2001 | Park et al. | 348/473 |
| 6,330,034 B1 | * | 12/2001 | Renner et al. | 348/536 |
| 6,445,817 B1 | * | 9/2002 | de la Torre-Bueno | 382/162 |
| 6,635,864 B2 | * | 10/2003 | Hirst | 250/234 |
| 6,833,875 B1 | * | 12/2004 | Yang et al. | 348/665 |
| 7,187,398 B2 | * | 3/2007 | Carlson et al. | 347/235 |
| 2005/0018080 A1 | | 1/2005 | Renner et al. | |

FOREIGN PATENT DOCUMENTS

KR  1020000004450  1/2000

* cited by examiner

*Primary Examiner* — Paulos Natnael

(74) *Attorney, Agent, or Firm* — F. Chau & Associates, LCC

(57) ABSTRACT

A synchronization detecting apparatus includes a counter, an error detector, and a line length generator. The counter counts to a predetermined counter value in response to a clock signal. The error detector generates an error, which is the difference between a current counter value received from the counter and a previous line length, in response to a synchronization flag signal. The line length generator generates a current line length based on a compensated error and the predetermined counter value. The synchronization flag signal has an active level at a transitioning edge of a synchronization pulse signal contained in an input signal.

13 Claims, 3 Drawing Sheets

APPARATUS FOR DETECTING SYNCHRONIZATION

CROSS-REFERENCE TO RELATED PATENT APPLICATIONS

This application claims priority to Korean Patent Application No. 10-2006-6292, filed on Jan. 20, 2006, the disclosure of which is herein incorporated by reference in its entirety.

BACKGROUND OF THE INVENTION

1. Technical Field

The present disclosure relates to a synchronization detecting apparatus and, more particularly to an apparatus for detecting the length of a line and detecting synchronization information based on the detected length of the line.

2. Discussion of Related Art

Various kinds of electronic devices include a video signal processor that processes an input analog video signal. For example, optical disk players, such as a digital versatile disk (DVD) player, and display systems, such as a video cassette recorder (VCR), a television (TV), and a personal computer (PC), include a video signal processor.

A video consists of a time-ordered sequence of images. Each image in the sequence is referred to as a frame. Different techniques are available to render the video, such as interlaced scanning.

In an interlaced scan method, each video frame is composed of two interlaced fields. Each of the fields consists of a plurality of scan lines or simply "lines" that make up an image. One of the two fields consists of odd-numbered scan lines, and the other field consists of even-numbered lines. The field that contains the first scan line from the top is called the upper or top field, and the other field is called the lower or bottom field.

A vertical synchronization (VSYNC) signal indicates timing information such as the beginning of a field. A horizontal synchronization (HSYNC) signal indicates timing information such as the beginning of a scan line.

An analog video signal supplied to a video signal processor may be a composite video blanking synchronization (CVBS) signal, a separate (S)-video signal, or a component signal.

The CVBS signal may be received via a tuner of a video signal processor such as a TV system. The S-video signal contains a luminance (Y) signal and a chrominance (C), signal and may be supplied to a video signal processor such as a VCR. The component signal contains a luminance (Y) signal and chrominance (Cb and Cr) signals (also called color difference signals Cb and Cr) and may be supplied to a video signal processor such as a DVD player.

FIG. 1 is a timing diagram of a CVBS signal 100 that is an example of an input video signal IVS supplied to a conventional video signal processor. When the analog video signal IVS supplied to a video signal processor is a CVBS signal, the video signal processor detects a synchronization signal and separates a luminance signal and a chrominance signal from the analog video signal IVS based on the synchronization signal.

However, in the case of an S-video signal or a component signal, the video signal processor need not separate the luminance signal from the chrominance signal because the luminance signal and the chrominance signal are transmitted separately in the S-video signal or the component signal transmission.

The video signal processor interpolates the luminance signal and the chrominance signal to generate a color signal that satisfies the standards of a display device, such as a liquid crystal display (LCD). The video signal processor may generate Red (R) Green (G) and Blue (B) video signals, or a color signal containing a luminance (Y) signal and chrominance (Cb and Cr) signals according to the display device standards. The generated color signal is displayed such that a user can view images on the display device.

Referring to FIG. 1, the CVBS signal 100 is comprised of a front porch signal 110, a horizontal synchronization pulse signal 130, a back porch signal 150 that contains a color burst signal 170, and an active video signal 190.

In a National Television System Committee (NTSC) method, the CVBS signal 100 includes 525 lines, each field consists of 262.5 lines and each line consists of 858 samples. In a phase alternating line (PAL) method, each line consists of 864 samples.

Each scan line of the CVBS signal 100 starts from a falling edge FE of the horizontal synchronization pulse signal 130 and ends at a falling edge FE of a next horizontal synchronization pulse signal 130.

The front porch signal 110 and the back porch signal 150 have a DC voltage level being referred to as a blank level BL, for example, 0 volts. The horizontal synchronization pulse signal 130 has a DC voltage level referred to as a sync level SL. A falling edge FE and a rising edge RE of the horizontal synchronization pulse signal 130 may be determined according to a DC threshold level TL. For example, the DC threshold level TL may be indicated as 50% of the amplitude of the horizontal synchronization pulse signal 130. The amplitude of the horizontal synchronization pulse signal 130 is equal to the absolute value of the difference between the blank level BL and a synchronization level SL.

A conventional method of detecting a horizontal synchronization signal and a vertical synchronization signal from the CVBS signal 100 will now be described with reference to FIG. 1. First, a blank level BL and a synchronization level SL are detected, and a threshold level TL is determined based on the detected blank level BL and the synchronization level SL. Falling edges FE or rising edges RE of the horizontal synchronization pulse signal 130 are detected based on the determined threshold level TL. A horizontal synchronization signal containing location information (time information) of the horizontal synchronization pulse signal 130 is detected using the difference between the detected falling edges FE (or the detected rising edges RE). A vertical synchronization signal may be detected by counting the detected horizontal synchronization signal to one-half the number of lines of the CVBS signal 100.

However, when the blank level BL and the synchronization level SL are changed due to noise, or a falling edge FE (or a rising edge RE) of the horizontal synchronization pulse signal 130 is deformed due to noise, the horizontal and vertical synchronization signals may not be correctly detected using the conventional method.

SUMMARY OF THE INVENTION

In an exemplary embodiment of the present invention, a synchronization detecting apparatus includes a counter, an error detector, and a line length generator. The counter counts to a predetermined counter value in response to a clock signal. The error detector generates an error, which is the difference between a current counter value received from the counter and a previous line length, in response to a synchronization flag signal. The line length generator generates a current line length based on a compensated error and the predetermined counter value. The synchronization flag signal has an active level at a transitioning edge of a synchronization pulse signal contained in an input signal.

In an exemplary embodiment of the present invention, a synchronization detecting apparatus includes a counter counting a scan line length between occurrences of synchronization signals of an input signal, an error detector detecting an offset between a current scan line length and a previous scan line length, and a line length generator generating a current line length based on a compensated error and a preset count value, wherein the error detector is triggered by a synchronization flag signal having an active triggering level at transitioning edge of the synchronization signals.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
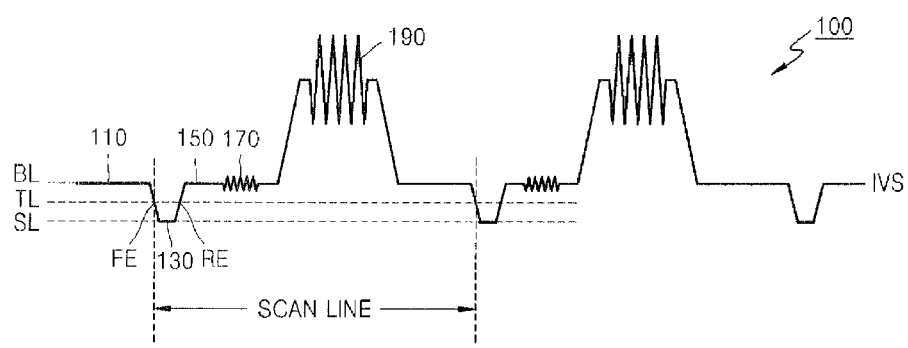
FIG. 1 is a timing diagram of an input video signal supplied to a conventional video signal processor.

Hereinafter, exemplary embodiments of the present invention will be described in detail with reference to the accompanying drawings. Like reference numerals refer to similar or identical elements throughout the description of the figures.

To process a video signal for display on a display device, a video signal processor (not shown) separates a luminance (Y) signal and a chrominance (C) signal from a received video signal. The luminance signal and the chrominance signal are separated from the video signal based on synchronization signals, such as a horizontal synchronization (HSYNC) signal and a vertical synchronization (VSYNC) signal, which are contained in the video signal. Thus, the video signal processor detects the synchronization signals before separation of the luminance signal and the chrominance signal.

A video signal processor detects falling edges FE or rising edges RE of the horizontal synchronization pulse signal 130 based on a threshold level TL, and detects a horizontal synchronization signal that contains location information (time information) of the horizontal synchronization pulse signal 130 using the difference between the detected falling edges FE (or the detected rising edges RE).

The difference between the falling edges FE (or the rising edges RE) may be equal to the length of a scan line (referred to herein as line length LLEN). For synchronization detection, the video signal processor must detect the falling edges FE (or the rising edges RE) and the line length LLEN. The line length LLEN may be detected using, for example, a line-locked, phase-locked loop (PLL).

The duration of a synchronization detection clock signal CLKSYNC generated for a time interval between a current horizontal synchronization pulse signal 130 and a next horizontal synchronization pulse signal 130 corresponds to the number of samples contained in a line. The line-locked PLL may control the synchronization detection clock signal CLKSYNC for synchronization detection to correspond to the line length LLEN.

Figure 3:
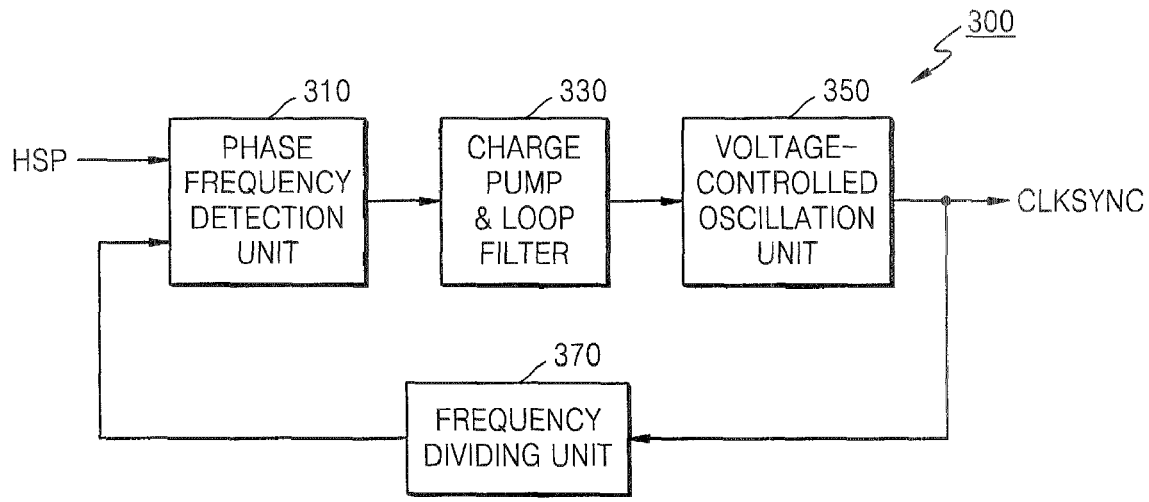
FIG. 3 is a block diagram of a line-locked, phase-locked loop (PLL) used for synchronization detection according to an exemplary embodiment of the present invention.

FIG. 3 is a block diagram of a line-locked PLL 300 used for synchronization detection according to an exemplary embodiment of the present invention. Referring to FIG. 3 the line-locked PLL 300 includes a phase frequency detection unit 310, a charge pump and loop filter block 330, a voltage-controlled oscillation (VCO) unit 350, and a frequency dividing unit 370.

The phase frequency detection unit 310 detects the phase difference between the frequencies of the horizontal synchronization extraction signal HSP and a synchronization detection clock signal CLKSYNC.

Figure 2:
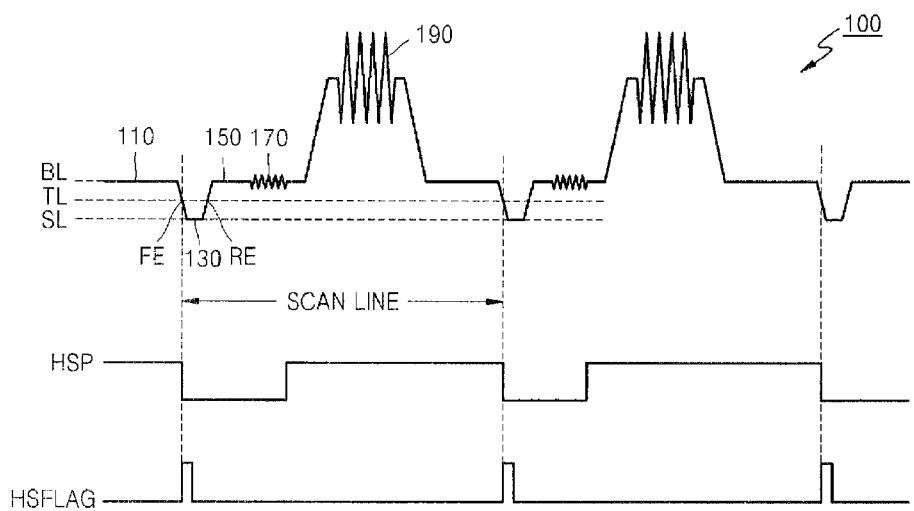
FIG. 2 is a timing diagram of a horizontal synchronization extraction signal HSP and a horizontal synchronization flag signal HSFLAG that are generated from an input video signal, such as the input video signal of FIG. 1.

FIG. 2 is a timing diagram of a horizontal synchronization extraction signal HSP and a horizontal synchronization flag signal HSFLAG generated from an input video signal, such as the input video signal IVS of FIG. 1. Referring to FIG. 2, the horizontal synchronization extraction signal HSP, which indicates the horizontal synchronization location of the input video signal IVS, is a pulse signal that goes low at each falling edge FE of a horizontal synchronization pulse signal. For example, the horizontal synchronization extraction signal HSP can be generated from the input video signal IVS through analog-to-digital conversion or low-pass filtering.

Referring to FIG. 3, the charge pump and loop filter block 330 controls an output voltage therefrom in response to the detected phase difference. The VCO unit 350 generates a synchronization detection clock signal CLKSYNC having a specific frequency in response to the output voltage of the charge pump and loop filter block 330. The frequency of the synchronization detection clock signal CLKSYNC corresponds to the number of samples in a line. For example, in a National Television System Committee (NTSC) method, the synchronization detection clock signal CLKSYNC has a frequency corresponding to 858 samples for a time interval between a falling edge and a next falling edge of the horizontal synchronization extraction signal HSP.

The frequency dividing unit 370, according to an exemplary embodiment of the present invention, divides the frequency of the synchronization detection clock signal CLKSYNC at a predetermined rate and feeds the division result back to the phase frequency detection unit 310. In the NTSC method, for detection of a phase difference by the phase frequency detection unit 310, the frequency dividing unit 370 divides the synchronization detection clock signal CLKSYNC at a ratio of 1/858 and feeds the division result back to the phase frequency detection unit 310.

In an exemplary embodiment of the present invention, the line-locked PLL 300 detects a phase difference between the input horizontal synchronization extraction signal HSP and the output synchronization detection clock signal CLKSYNC, and adjusts the frequency of the synchronization detection clock signal CLKSYNC according to the detected phase difference, and the frequency of the synchronization detection clock signal CLKSYNC may be equalized with that of the input video signal IVS.

However, when a falling edge FE or a rising edge RE of the horizontal synchronization pulse signal 130 is distorted or damaged by noise, synchronization detection may not be achieved using the line-locked PLL 300 operating according to an analog method. In an exemplary embodiment of the present invention, synchronization detection is performed using a digital method in which the line length of the input video signal IVS is detected using a specific clock signal.

Figure 4:
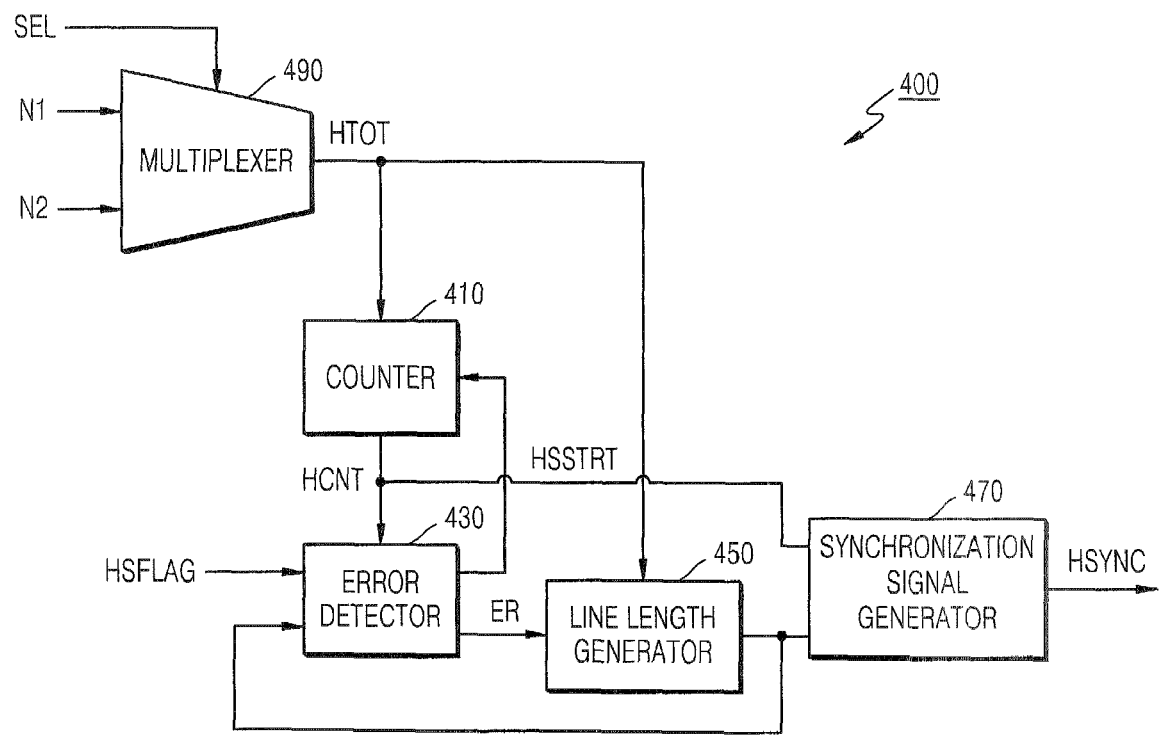
FIG. 4 is a block diagram of a synchronization detecting apparatus according to an exemplary embodiment of the present invention.

FIG. 4 is a block diagram of a synchronization detecting apparatus 400 according to an exemplary embodiment of the present invention. Hereinafter, the synchronization detecting apparatus 400 will be described as an apparatus that detects horizontal synchronization of an input video signal (not shown).

However, it is to be understood that the synchronization detecting apparatus 400 can be used to detect not only horizontal synchronization but also vertical synchronization. The synchronization detecting apparatus 400 can be used to realize an analog-type PLL in a digital manner in the field of an analog-type PLL.

As shown in FIG. 4, the synchronization detecting apparatus 400 includes a counter 410, an error detector 430, and a line length generator 450. The synchronization detecting apparatus 400 may include a synchronization signal generator 470. In an exemplary embodiment of the present invention, the synchronization detecting apparatus 400 includes a multiplexer 490.

The counter 410 counts to a specific counter value HTOT in response to a clock signal (not shown). The counter value HTOT may be set to N1 or N2 depending on the type of the input video signal. For example, the counter value HTOT may be set to N1, e.g., 858, when using the NTSC method, and may be set to N2, e.g., 864, when using a phase alternating line (PAL) method.

As illustrated in FIG. 4, the multiplexer 490 sets the counter value HTOT to N1 or N2 in response to a selection signal SEL. The selection signal relies upon characteristics of an input signal, such as for example, the type of the input video signal.

The error detector 430 generates an error ER, which is the difference between a current counter value HCNT received from the counter 410 and a previous scan line length LLEN, in response to a first-level synchronization flag signal HSFLAG. For example, the error detector 430 generates the error ER by taking the difference between the sum of the previous scan line length LLEN and a specific offset OFFSET, and the current counter value HCNT.

In an exemplary embodiment of the present invention described in connection with FIG. 4, the synchronization flag signal HSFLAG is generated in response to a synchronization pulse signal contained in the input signal, such as the input video signal IVS. Referring to FIG. 2, the synchronization flag signal HSFLAG is a pulse signal that has a first level at a location having a specific threshold level TL of a falling edge FE of the horizontal synchronization pulse signal 130, and a second level at other locations thereof. That is, the synchronization flag signal HSFLAG has the first level at the falling edge FE of the horizontal synchronization pulse signal 130 and the second level at the other locations thereof. In an exemplary embodiment of the present invention, the first level is a logic high level and the second level is a logic low level.

It is to be understood that the synchronization flag signal HSFLAG may have the first level at a rising edge RE of the horizontal synchronization pulse signal 130 and the second level at the other locations thereof. Embodiments of the present invention may be implemented using a signal having periodic pulsations, such as a horizontal synchronization pulse signal or a vertical synchronization pulse signal.

The line length generator 450 generates a current line length LLEN based on a compensated error ERAR, which may be obtained by automatic compensation of the error ER and the current counter value HCNT. The line length generator 450 compensates for the error ER, for example, using auto regression, to generate the compensated error ERAR.

Operations of a synchronization detecting apparatus according to an exemplary embodiment of the present invention will be described in detail with reference to FIG. 4 through FIG. 7.

Figure 5:
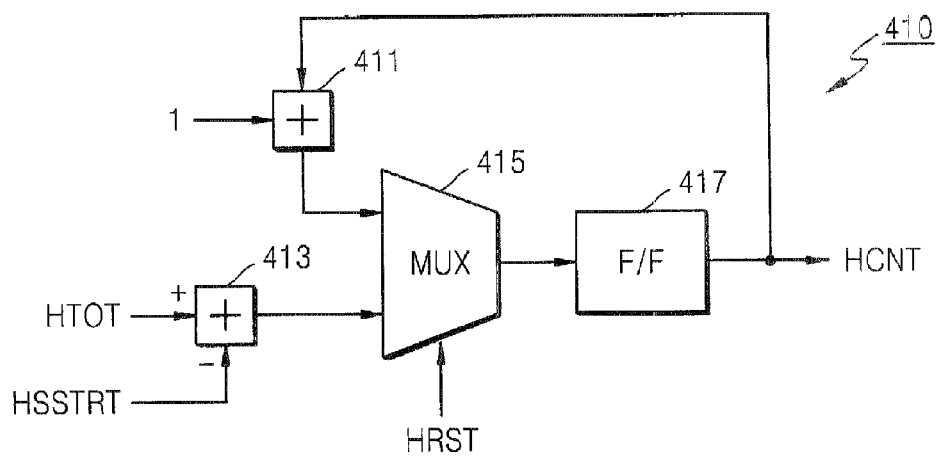
FIG. 5 is a block diagram of a counter of FIG. 4 according to an exemplary embodiment of the present invention.

FIG. 5 is a block diagram of the counter 410 of FIG. 4 according to an exemplary embodiment of the present invention. The counter 410 counts to a specific counter value HTOT in response to a clock signal (not shown). For example, the frequency of the clock signal may be determined such that counting is performed to reach the counter value HTOT (N1 or N2) for a time interval between a first level and a next first level of the synchronization flag signal HSFLAG.

If a current counter value HCNT becomes equal to the counter value HTOT, the counter 410 enables a counter reset signal HRST and is reset in response to the enabled counter reset signal HRST. For example, the counter 410 is reset to the difference between the counter value HTOT and a value of a next synchronization start signal HSSTRT, not zero. The next synchronization start signal HSSTRT is generated in response to the current line length LLEN. This process will be described in connection with the error detector 430, later in this disclosure.

In an exemplary embodiment of the present invention, the counter 410 is reset to the difference between the counter value HTOT and the value of the next synchronization start signal HSSTRT, not zero, and a synchronization detecting apparatus may be capable of compensating for an error in synchronization detection.

Referring to FIG. 5, the counter 410 includes a first adder 411, a second adder 413, a multiplexer 415, and a flip flop 417. The first adder 411 performs counting by increasing the counter value HCNT by 1. The second adder 413 outputs the difference between the counter value HTOT and the next synchronization start signal HSSTRT.

The multiplexer 415 selects one of the outputs of the first and second adders 411 and 413 respectively, in response to the counter reset signal HRST. The output of the second adder 413 is selected and output in response to the enabled counter reset signal HRST. The flip flop 417 updates the output of the multiplexer 415 and stores the updated output in response to a clock signal (not shown).

Figure 6:
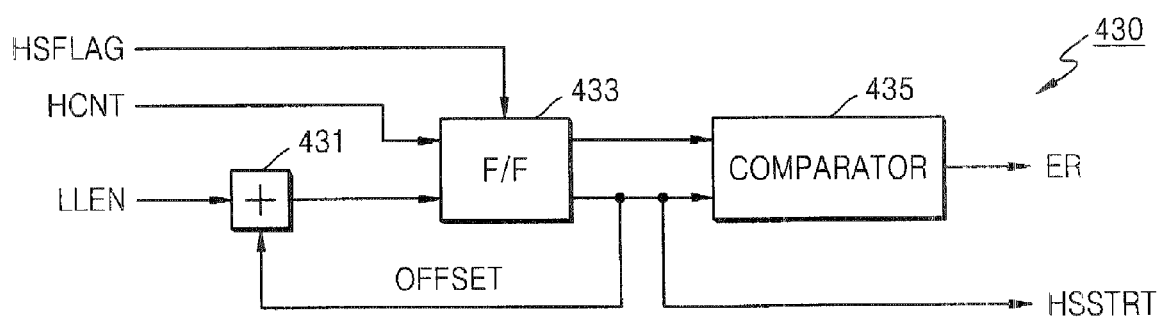
FIG. 6 is a block diagram of an error detector of FIG. 4, according to an exemplary embodiment of the present invention.

FIG. 6 is a block diagram of the error detector 430 of FIG. 4, according to an exemplary embodiment of the present invention. When the synchronization flag signal HSFLAG has the first level, the error detector 430 compares a corrected line length, which is obtained from the sum of the previous scan line length LLEN and an offset OFFSET, and the counter value HTOT and outputs the difference therebetween as the error ER. The error detector 430 outputs an integral part of the corrected line length as the next synchronization start signal HSSTRT and determines a decimal part of the corrected line length as the offset OFFSET.

Referring to FIG. 6, the error detector 430 includes an offset adder 431, an error detection storage unit 433, and a comparator 435. The offset adder 431 combines the previous scan line length LLEN with the offset OFFSET to generate the corrected line length. As illustrated in FIG. 6, an integral part and a decimal part of the corrected line length are determined as the next synchronization start signal HSSTRT and the offset OFFSET, respectively.

The error detection storage unit 433 updates and stores the current counter value HCNT and the corrected line length in response to the synchronization flag signal HSFLAG. For example, a previous counter value HCNT stored at a previous first level of the synchronization flag signal HSFLAG, and a corrected line length output from an offset storage unit (not shown) are updated with a current counter value HCNT counted by the counter 410 at a first level of the counter synchronization flag signal HSFLAG, and an output of the offset adder 431, respectively. The error detection storage unit 433, which may be a flip flop, updates and stores the current counter value HCNT and the output of the offset adder 431.

The comparator 435 compares the current counter value HCNT and the corrected line length stored in the error detection storage unit 433 and outputs the difference between the current counter value HCNT and the corrected line length as the error ER. The error detection storage unit 433 may perform updating whenever the synchronization flag signal HSFLAG has the first level, and the error ER may be computed whenever the synchronization flag signal HSFLAG has the first level.

Figure 7:
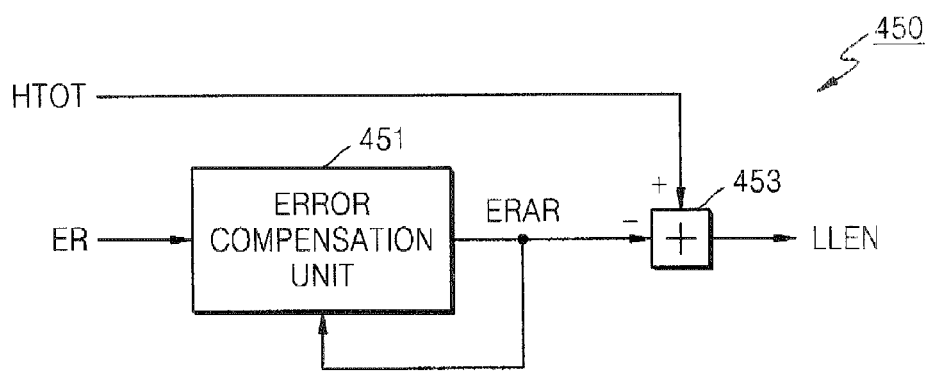
FIG. 7 is a block diagram of a line length generator of FIG. 4, according to an exemplary embodiment of the present invention.

FIG. 7 is a block diagram of the line length generator 450 of FIG. 4, according to an exemplary embodiment of the present invention. The line length generator 450 includes an error compensation unit 451 and a line length output unit 453. The error compensation unit 451 generates a compensated error ERAR from the error ER and a previously compensated error ERAR. For example, the error ER is compensated for to prevent a rapid change in an error value used to generate a line length.

In an exemplary embodiment of the present invention, the error compensation unit 451 generates the compensated error ERAR using auto regression. Auto regression may be performed using Equation 1

$$\text{Compensated error} = (\text{first weight} \times \text{previously compensated error} + \text{error})/\text{second weight} \quad (1)$$

For example, the first weight may be 127 and the second weight may be 128.

The line length output unit 453 outputs the difference between the counter value HTOT and the compensated error ERAR as the current line length LLEN. Referring to FIG. 7, the line length output unit 453 may be an adder that combines a negative value of the compensated error ERAR with the counter value HTOT.

As illustrated in FIG. 4, the synchronization detecting apparatus 400 may include the synchronization signal generator 470 that generates a synchronization signal HSYNC according to counter values HCNT and line lengths LLEN, which may be consecutively generated in response to the synchronization flag signal HSFLAG.

When the synchronization flag signal HSFLAG has the first level, a current counter value HCNT generated by the counter 410 represents an actual synchronization location. In an exemplary embodiment the present invention a synchronization signal HSYNC indicates a synchronization location (synchronization timing information) using the current counter value HCNT and a current line length LLEN.

A synchronization detecting apparatus according to an exemplary embodiment the present invention detects a line length using an external clock signal that is not related to an input video signal, and detects a synchronization location using the detected line length, and an accurate synchronization location may be detected even when the input video signal deforms due to noise.

A synchronization detecting apparatus according to an exemplary embodiment of the present invention performs synchronization detection according to a digital method, and the size of a semiconductor device may be reduced during a manufacturing process and performance degradation caused by external causes, such as temperature or a board condition, may be prevented.

Although exemplary embodiments of the present invention have been described in detail with reference to the accompanying drawings for the purpose of illustration, it should be understood that the inventive processes and apparatus should not be construed as limited thereby. It will be apparent to those of ordinary skill in the art that various modifications to the foregoing exemplary embodiments may be made without departing from the scope of the invention as defined by the appended claims with equivalents of the claims to be included therein.

What is claimed is:

1. A synchronization detecting apparatus comprising:
   a counter counting to a pre-determined counter value in response to a clock signal;
   an error detector generating an error, which is a difference between a current counter value received from the counter and a previous line length, in response to a synchronization flag signal; an
   a line length generator generating a current line length based on the pre-determined counter value and a compensated error, where the compensated error is obtained by automatic compensation of the error,
   wherein the synchronization flag signal has an active level at a transitioning edge of a synchronization pulse signal contained in an input signal,
   wherein the error detector outputs the error obtained by taking a difference between the current counter value and a corrected line length that is a sum of the previous line length and a predetermined offset, and outputs an integral part and a decimal part of the corrected line length as a next synchronization start signal and offset, respectively.

2. The synchronization detecting apparatus of claim 1, wherein the error detector comprises:
   an offset adder combining the offset and the previous line length to generate the corrected line length;
   an error detection storage unit updating and storing the current counter value and the corrected line length in response to the synchronization flag signal; and
   a comparator comparing the current counter value stored in the error detection storage unit with the corrected line length and outputting a difference between the current counter value and the corrected line length as the error.

3. The synchronization detecting apparatus of claim 2, wherein the error detection storage unit is a flip flop.

4. The synchronization detecting apparatus of claim 1, wherein the line length generator comprises:
   an error compensation unit generating the compensated error based on the error and a previously compensated error; and
   a line length output unit outputting a difference between the counting result and the compensated error as the current line length.

5. The synchronization detecting apparatus of claim 4, wherein the error compensation unit generates the compensated error using auto regression.

6. The synchronization detecting apparatus of claim 5, wherein the compensated error=(first weight×previously compensated error+error)/second weight.

7. The synchronization detecting apparatus of claim 1, wherein the counter is reset to a difference between the predetermined counter value and the next synchronization start signal, in response to a counter reset signal.

8. The synchronization detecting apparatus of claim 7, wherein the counter reset signal is generated when the current counter value is to the predetermine counter value.

9. The synchronization detecting apparatus of claim 1, further comprising a synchronization generating a synchronization signal from current counter values and line lengths which are consecutive generated in response to the synchronization flag signal.

10. The synchronization detecting apparatus of claim 1, wherein the counting result is 858 when a national television system committee method is used.

11. The synchronization detecting apparatus of claim 1, wherein the counting result is 864 when a phase alternating line method is used.

12. The synchronization detecting apparatus of claim 1, wherein the line length generator comprises a line-locked phase-locked loop (PLL).

13. A synchronization detecting apparatus comprising:
a counter counting to a preset counter value in response to a clock signal;
an error detector detecting an error between a current counter value from the counter and a previous scan line length; and
a line length generator generating a current scan line length based on the present count value and a compensated error, where the compensated error is obtained by automatic compensation of the error,
wherein the error detector is triggered by a synchronization flag signal having an active triggering level at a transitioning edge of a synchronization signal of an input signal,
wherein the error detector outputs the error obtained by taking a difference between the current counter value and a corrected scan line length that is a sum of the previous scan line length and a predetermined offset, and outputs an integral part and a decimal part of the corrected scan line length as a next synchronization start signal and offset, respectively.

* * * * *